(12) United States Patent
Nagai et al.

(10) Patent No.: US 9,770,739 B2
(45) Date of Patent: Sep. 26, 2017

(54) METHOD FOR PRODUCING METAL AUTOMOTIVE PART AND METAL AUTOMOTIVE PART

(71) Applicant: NTN CORPORATION, Osaka (JP)

(72) Inventors: Hiromi Nagai, Shizuoka (JP); Shintaro Suzuki, Shizuoka (JP); Toshihiro Nishio, Osaka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/026,203

(22) PCT Filed: Sep. 19, 2014

(86) PCT No.: PCT/JP2014/074788
§ 371 (c)(1),
(2) Date: Mar. 30, 2016

(87) PCT Pub. No.: WO2015/046031
PCT Pub. Date: Apr. 2, 2015

(65) Prior Publication Data
US 2016/0243584 A1 Aug. 25, 2016

(30) Foreign Application Priority Data
Sep. 30, 2013 (JP) .................................. 2013-203239

(51) Int. Cl.
| | | |
|---|---|---|
| *B05D 1/12* | (2006.01) | |
| *B05B 5/00* | (2006.01) | |
| *B05B 5/03* | (2006.01) | |
| *B05D 1/32* | (2006.01) | |
| *B05D 1/00* | (2006.01) | |
| *F16D 3/16* | (2006.01) | |

(Continued)

(52) U.S. Cl.
CPC .................. *B05D 1/12* (2013.01); *B05B 5/00* (2013.01); *B05B 5/03* (2013.01); *B05B 5/032* (2013.01);

(Continued)

(58) Field of Classification Search
None
See application file for complete search history.

(56) References Cited

U.S. PATENT DOCUMENTS 4,986,210 A * 1/1991 Hollstein ................ B05B 5/032
  118/308
2013/0180629 A1 7/2013 Suzuki

FOREIGN PATENT DOCUMENTS

EP 2620513 A1 7/2013
JP S55-102461 A 8/1980
(Continued)

OTHER PUBLICATIONS

International Search Report for PCT/JP2014/074788 dated Jan. 6, 2015.

(Continued)

*Primary Examiner* — Lisha Jiang
(74) *Attorney, Agent, or Firm* — Hedman & Costigan, P.C.; James V. Costigan; Kathleen A. Costigan (57) ABSTRACT

A method for producing a columnar or cylindrical metal automotive part whose outer circumferential surface includes a portion to be coated with paint and a portion to be uncoated therewith includes the following processes: (1) a process of providing a convergent nozzle-shaped covering jig which covers an outer circumferential surface of the columnar or cylindrical part at an axial end thereof and covers the portion to be uncoated with the paint, with a gap formed between the covering jig and the outer circumferential surface of the part; (2) a process of discharging a gas from the gap toward an end of a nozzle of the covering jig with the columnar or cylindrical part being rotated; (3) a process of sticking a film-forming substance to the columnar or cylindrical part from an axial side surface thereof.

4 Claims, 8 Drawing Sheets

(51) Int. Cl.
*F16D 3/205* (2006.01)
*B05D 1/02* (2006.01)

(52) U.S. Cl.
CPC .............. *B05D 1/002* (2013.01); *B05D 1/32* (2013.01); *F16D 3/16* (2013.01); *B05D 1/02* (2013.01); *F16D 3/2055* (2013.01); *F16D 2200/0021* (2013.01); *F16D 2200/0056* (2013.01); *F16D 2200/0082* (2013.01); *F16D 2300/12* (2013.01)

(56) References Cited

FOREIGN PATENT DOCUMENTS

| | | |
|---|---|---|
| JP | 61-161174 A | 7/1986 |
| JP | S63-236567 A | 10/1988 |
| JP | 04-246121 A | 9/1992 |
| JP | 05-015820 A | 1/1993 |
| JP | 10-263448 A | 10/1998 |
| JP | 2008-264736 A | 11/2008 |
| JP | 2008-280554 A | 11/2008 |
| JP | 2010-214261 A | 9/2010 |
| JP | 2010-247052 A | 11/2010 |
| WO | 2012/039255 A1 | 3/2012 |

OTHER PUBLICATIONS

English Abstract for JP S55-102461 A dated Aug. 5, 1980.
English Abstract for JP 2008-264736 A dated Nov. 6, 2008.
English Abstract for JP S63-236567 A dated Oct. 3, 1988.
Supplementary European Search Report in corresponding EP application dated May 4, 2017 and mailed May 15, 2017.

* cited by examiner

PRIOR ART

Fig. 6

PRIOR ART

METHOD FOR PRODUCING METAL AUTOMOTIVE PART AND METAL AUTOMOTIVE PART

TECHNICAL FIELD

The present invention relates to a method for producing a metal automotive part and more particularly to masking in a powder coating method to be carried out for a columnar or tubular metal automotive part.

BACKGROUND ART

Figure 8:
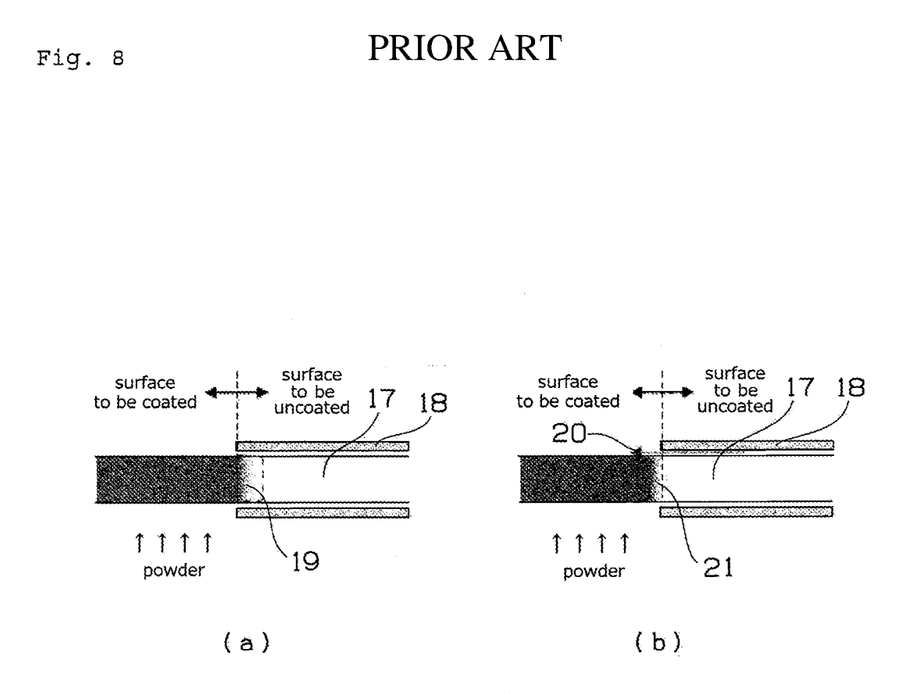
FIG. 8 is an explanatory view for explaining a conventional masking method.

The powder coating method is utilized in many fields such as automobile parts, steel tubes, home appliances, household goods, and the like. The powder coating method is carried out to apply powder mainly to a flat surface of an exterior portion having a large area. In many cases, the powder coating method is used to apply the powder to the entire surface of an object to be coated (hereinafter referred to as work). But there is a case in which the work has a portion to be uncoated on its surface. In that case, it is necessary to mask the surface to be uncoated. As normal masking methods, a masking tape and a cap are widely used. In that case, it is necessary for an operator to manually perform these methods. As a method of automating an operation of masking the surface to be uncoated, the method to be carried out by using a masking jig is proposed, as shown in FIG. 8(a). FIG. 8(a) is a sectional view showing a case in which a work which is rotating or at a standstill is coated with coating paint by using the jig. In a case where a portion of a work 17 is coated with coating paint in a direction shown with arrows, a masking jig 18 is disposed in the vicinity of the work 17. But in the case of powder coating and in particular in the case of electrostatic powder coating, a portion 19 into which powder coating paint penetrates is generated in a gap between the masking jig 18 and the surface of the work 17. Thus the above-described powder coating method has a problem that the powder is liable to stick to the portion to be uncoated.

As a countermeasure for this problem, as shown in FIG. 8(b), the method of preventing the powder coating paint from penetrating into the gap between the work 17 and the masking jig 18 by flowing a compressed gas 20 into the gap is known (patent documents 1 through 3).

This method is capable of preventing the powder coating paint from penetrating into the gap between the work and the masking jig by increasing the flow rate of the compressed air unlike the method shown in FIG. 8(a). But in this method, the flow velocity of the air is high at a boundary between the portion to be coated and the portion to be uncoated. As a result, a portion 21 where the thickness of the coated paint decreases is generated. Thus the above-described powder coating method has a problem that the corrosion resistance of the coating film deteriorates.

It is necessary for a drive shaft which transmits a power from an engine of a car to a drive wheel to respond to an angular displacement and an axial displacement caused by a change in a relative positional relationship between the engine and a wheel. Therefore the drive shaft has a construction in which an engine side (inboard side) is equipped with a sliding type constant velocity universal joint and a drive shaft side (outboard side) is equipped with a fixed type constant velocity universal joint, and both constant velocity universal joints are coupled to each other with a metal intermediate shaft.

Both the sliding type and the fixed type constant velocity universal joint incorporated in the drive shaft have a metal outer joint member constructed of a cup part accommodating inner parts including an inner joint member coupled to the above-described intermediate shaft and a stem part axially and integrally extended from the cup part.

The metal automotive part composed of the outer joint member of the constant velocity universal joint positioned at the inboard side, the outer joint member of the constant velocity universal joint positioned at the outboard side, and the metal intermediate shaft coupling both constant velocity universal joints to each other is formed by molding materials by forging. Thereafter to enhance the strength of the metal automotive part, the surface thereof is cured by heat treatment of quenching. After the quenching finishes, the part is tempered to enhance the toughness thereof and release a portion of a stress generated owing to the quenching so that occurrence of quenching crack is prevented. A resin coating film is formed on the outer surfaces of these parts to improve corrosion resistance thereof.

As a method of forming the resin coating film, there is disclosed a method and an apparatus for tempering and baking the automotive part by high-frequency induction heating at the same time after subjecting the metal automotive part to induction hardening and thereafter applying powder paint to the outer surface thereof (patent document 4). This method is capable of shortening a treatment period of time required to temper the metal automotive part and bake a coating agent and reducing the cost.

In a case where a precision part such as an outer ring of the constant velocity universal joint is coated with the powder paint, its sliding portion, fitting portion, and gear portion are required to have high dimensional accuracy and high degree of cleanliness. Thus a masking method capable of completely preventing the paint from penetrating thereinto is essentially required. In the method of flowing the air directly to the gap between the masking jig and the work, it is difficult to completely prevent the paint from penetrating into the gap. This method has a problem that the corrosion resistance of the coating film deteriorates owing to a decrease in the thickness of the coating film.

In the method of coating the metal automotive part formed by tempering the quenched automotive part such as the constant velocity universal joint and bake-curing the coating powder paint at the same time, the above-described coating method has a problem that the thickness of the coating film fluctuates because convex and concave portions are present on a paint-applied portion according to the configuration of the inside of an outer ring of the constant velocity universal joint.

PRIOR ART DOCUMENTS

Patent Documents

Patent document 1: Japanese Patent Application Laid-Open Publication No. 2008-280554
Patent document 2: Japanese Patent Application Laid-Open Publication No. 2010-214261
Patent document 3: Japanese Patent Application Laid-Open Publication No. 2010-247052
Patent document 4: International Publication WO2012/039255

SUMMARY OF THE INVENTION

Problem to be Solved by the Invention

The present invention has been made to deal with the above-described problems. Therefore it is an object of the present invention to provide a method for uniformly forming a film on an outer circumferential portion of a metal automotive part by preventing penetration of a coating substance into a portion thereof unnecessary to be coated with paint and the metal automotive part to be produced by the above-described method.

Means for Solving the Problem

The present invention provides a method for producing a columnar or cylindrical metal automotive part whose outer circumferential surface includes a portion to be coated with paint and a portion to be uncoated therewith. The method includes the following process.

(1) A process of providing a convergent nozzle-shaped covering jig which covers an outer circumferential surface of the columnar or cylindrical part at an axial end thereof and covers the portion to be uncoated with, with a gap formed between the covering jig and the outer circumferential surface of the part.

(2) A process of discharging a gas from the gap toward an end of a nozzle of the covering jig with the columnar or cylindrical part being rotated.

(3) A process of sticking a film-forming substance to the columnar or cylindrical part from an axial side surface thereof.

In the method for producing the metal automotive part, the gas discharged from the gap in the gas discharging process is flowed toward an axial end surface of the columnar metal automotive part or toward an inner surface of the cylindrical metal automotive part and thereafter discharged from the gap through a space inside the covering jig.

The gas is compressed air. The film-forming substance is powder coating paint.

The columnar or cylindrical metal automotive part of the present invention is produced by the producing method.

Effect of the Invention

In the method of the present invention for producing the metal automotive part, the convergent nozzle-shaped covering jig is provided with the gap formed between the covering jig and the outer circumferential surface of the rotating part. The gas is discharged from the gap. Therefore it is possible to uniformly form the coating film on the circumferential portion of the cylindrical or columnar metal automotive part.

In addition, the production method of the present invention does not generate unnecessary deposition, spillage, and fat edge at the boundary between the portion to be coated with the paint and the portion to be uncoated therewith.

MODE FOR CARRYING OUT THE INVENTION

Examples of a columnar or cylindrical metal automotive part include an outer joint member constructing a constant velocity universal joint and an intermediate shaft constructing a drive shaft.

Carbon steel for machine structural use is molded by carrying out a forging method and thereafter the carbon steel for machine structural use is quenched and tempered to produce these metal automotive parts. The outer surfaces of the metal automotive parts are coated with paint to prevent them from rusting. Work hardening caused by forging, thermal stress caused by quenching, and quenching distortion caused by transformation stress are generated on the surfaces of the parts. Further, heating causes the parts to generate a plurality of iron oxides different from one another in oxidation states thereof on the surfaces thereof. Therefore the outer surfaces of the parts are not chemically and physically uniform as the surfaces to be coated with powder paint, but make it difficult to improve the adhesiveness of a coating film.

The outer joint member constructing the constant velocity universal joint is composed of a cup part and a shaft part. In many cases, the boundary between the cup part and the shaft part is thick. There is a case in which the outer joint member is subjected to thermal strain because the thick portion and the cup part are different from each other in the rate of temperature rise and the rate of temperature drop when the coating film is formed. In this case, the adhesiveness of the coating film is liable to deteriorate.

The neighborhood of the outer circumference of an end of an open portion of the cup is coupled to a boot with a large-diameter inner surface thereof covering the neighborhood of the outer circumference of the end of the open portion of the cup. Thus the neighborhood of the outer circumference of the end of the open portion of the cup is a region where the coating film is unnecessary to be formed. Cylindrical parts and shafts each having a spline formed at both sides thereof are set as portions to be uncoated with paint to secure fitting accuracy. As described above, each of the outer circumferential surfaces of the metal automotive parts has the portion to be coated with the paint and the portion to be uncoated therewith. Thus it is necessary to distinguishably coat the outer circumferential surfaces thereof with the paint.

The metal automotive parts are demanded to have a high degree of rust-proofing and chipping resistance. In a case where the coating film has a thin portion, the metal automotive parts have a low degree of rust-proofing. In a case where the lower limit of the thickness of the coating film is increased, a portion where the paint is excessively applied is generated on the outer surfaces of the metal automotive parts. As a result, the metal automotive parts have a low degree of mechanical accuracy, and the coating film has a low degree of adhesiveness to the outer surfaces thereof. Thereby the metal automotive parts have a low degree of chipping resistance.

In the method of the present invention, a convergent nozzle-shaped covering jig is disposed adjacently to the metal automotive part which rotates when the coating film is formed by proving a gap between the covering jig and an outer circumferential surface of the metal automotive part. Further, the flow velocity and flow rate of a gas to be discharged from the gap are adjusted by circulating and stagnating the gas in a space inside the covering jig. Thereby the present inventors have found that it is possible to uniformly form the coating film on the outer circumferential portion of the metal automotive part and that unnecessary deposition, spillage, and fat edge are not generated on the outer circumferential portion at the boundary between a portion where the coating film has been formed and a portion where the coating film has not been formed. The present invention is based on the above-described knowledge.

Figure 1:
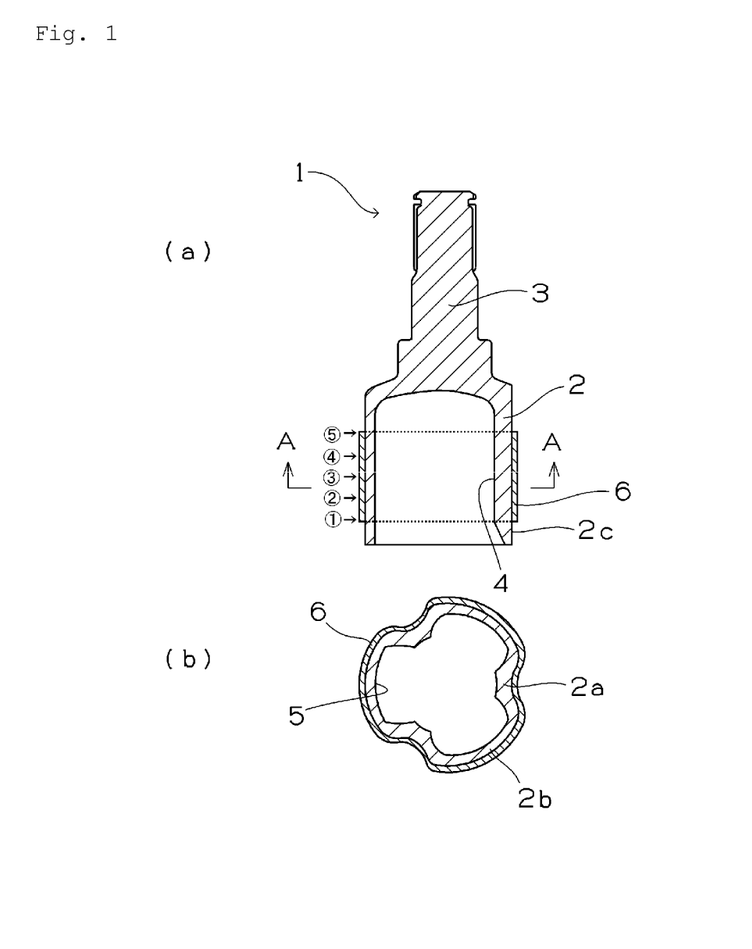
FIG. 1 shows one example of a metal automotive part.

FIG. 1 shows one example of a metal automotive part. FIG. 1(a) is a sectional view of an outer joint member composing a constant velocity universal joint as viewed in a radial direction thereof. FIG. 1(b) is a sectional view taken along a line A-A as viewed from a cup part.

An outer joint member 1 is constructed of a cup part 2 and a shaft part 3 extending axially from a bottom portion of the cup part 2. The cup part 2 is spherically formed in its inner circumferential surface 4 and has an axially extended track groove 5, having a torque transmission ball (not shown in the drawings) incorporated therein, which is formed at a plurality of portions of the inner circumferential surface 4 in a circumferential direction thereof. The track groove 5 is formed as an arc-shaped curve in its sectional configuration along the bottom thereof. The cup part 2 of the outer joint member 1 has a tubular configuration having a concave portion 2a and a convex portion 2b. A coating film 6 is formed on the outer circumferential surface of the cup part 2. Numerals each enclosed within a circle indicate positions where the thickness of the coating film is measured.

In the present invention, the cylindrical configuration or the columnar configuration means a variant cylindrical or columnar configuration, other than a perfect cylindrical or columnar configuration, which allows parts having the variant cylindrical or columnar configuration to be coated with paint while the parts are rotating. For example, the variant cylindrical or columnar configuration includes a sectionally flower-shaped configuration. The coating film is not formed on the axial end surface of the cylindrical part or on the inner circumferential surface of the columnar part.

The outer joint member 1 is produced from a columnar material consisting of carbon steel for machine structural use such as S40C, S43C, S45C, S48C, S50C, S53C, S55C, and S58C defined by JISG4051 through a plurality of forging processes including cold forging, hot forging, and warm forging. In a final forging process, the carbon steel for machine structural use is subjected to the cold forging to improve the mechanical strength of the surface thereof. The cold forging temperature is set to favorably not less than 0 degrees C. nor more than 50 degrees C.

The work-hardened surface of the outer joint member which has subjected to a compressive stress and plastically deformed in the cold forging significantly increases in its tensile strength, yield point, elastic limit, and hardness, but significantly decreases in its elongation and reduction of area.

In the present invention, it is preferable to set the surface hardness of the outer surface of the cold-forged outer joint member which is a metal automotive part to HRB90 to 110. In the case where the surface hardness thereof is less than HRB90, the curing of the foundation is insufficient. Thus in the case where the outer surface thereof is coated with the paint, the coating film formed on the outer surface thereof is adversely affected by the hardness of the foundation and thus decreases in its hardness. In the case where the surface hardness of the outer surface thereof exceeds HRB110, the outer surface thereof has a low degree of machinability, which is unpreferable.

It is preferable to set the surface hardness of the quenched outer joint member to HRC50 to 65. In the case where the surface hardness thereof is less than HRC50, the outer joint member has an insufficient wear resistance and thus a short rolling life. In the case where the surface hardness thereof exceeds HRC65, there is a case where the outer joint member is liable to chip or break early.

The surface hardness of the cold-forged and quenched outer joint member is not uniform because the outer surface thereof has different degrees of processing in dependence on portions of the outer surface thereof.

After the outer joint member is cold-forged, there is a case where the surface of an end of the cup part 2 in the shaft part direction is subjected to turning.

There is a case where a turned surface has different structures of a metal material according to a turned portion and a turned depth from the surface of the end of the cup part in the shaft part direction, which may cause lubricating oil used during a turning operation to remain on the turned surface.

As an apparatus and a method for quenching the metal automotive part, it is possible to adopt an apparatus having a heating part which heats the metal automotive part at a high temperature until the surface thereof has an austenite structure and a cooling part which rapidly cools the metal automotive part to transform the austenite structure into a martensite structure and a method capable of heating and cooling the metal automotive part.

As the heating part, a high frequency quenching apparatus using a power supply having a frequency of not less than 1 KHz is exemplified. As the cooling part, a cooling water jetting apparatus is exemplified.

After the outer joint member is quenched, the coating film 6 is formed on the outer surface thereof to improve its corrosion resistance. The coating film is formed on the outer surface thereof by coating the outer surface thereof with powder paint and thereafter by tempering and baking the outer surface thereof at the same time. The outer joint member can be tempered and baked by using the high-frequency induction heating apparatus of the coil-pass type or the multistage type and the method described in the patent document 4.

A tip portion 2c of the outer surface of the outer joint member 1 is formed as an uncoated portion where the coating film 6 is not formed because a boot is fixed thereto.

As pretreatment for improving adhesiveness of a coating surface, it is possible to subject the coating surface to chemical conversion treatment such as degreasing treatment, iron phosphate treatment, and zinc phosphate treatment and treatment of cleansing the coating surface with an alkaline detergent. As the pretreatment, it is preferable to subject the coating surface to the cleansing treatment without subjecting it to the chemical conversion treatment.

As the alkaline detergent, it is possible to use a cleansing agent consisting of an alkaline aqueous solution capable of removing a reactive soap layer or an unreactive soap layer which has remained on the outer surface of the outer joint member in the cold forging process and the quenching process.

For example, a cleansing agent containing less than 5 mass % of a sodium hydroxide aqueous solution as the main component thereof is preferable. An alkaline cleansing agent with which a surface active agent capable of degreasing the surface of the metal automotive part, preventing the surface thereof from rusting, and performing peeling coexists is preferable.

Examples of the alkaline cleansing agents commercially available include an Acrosin cleansing agent produced by Kiwa Chemical Industry Co., Ltd., Liomic cleansing agent produced by Lion Co., Ltd., WA-based cleansing agent produced by Kaken Tech Co., Ltd., and Light Clean produced by Kyoeisha Chemical Co., Ltd.

As cleansing methods to be carried out by using the alkaline cleansing agent, it is possible to adopt immersion cleansing, jet cleansing, and ultrasonic cleansing at a cleansing temperature of 50 to 80 degrees C.

The coating film 6 is formed by using a powder coating method. As powder to be used in powder coating, it is preferable to use epoxy resin powder paint, polyester resin powder paint, acrylic resin powder paint or composite powder paints each consisting of a mixture of these powder paints. The powder coating method allows the coating film to have a thickness not less than 50 μm in one-time coating operation and coating performance such as corrosion resistance to be improved.

Of the above-described powders, the epoxy resin powder paint is preferable because it is excellent in the corrosion resistance, acid resistance, alkali resistance, moisture resistance, and surface hardness of the formed coating film.

The epoxy resin powder paint which can be used in the present invention contains bisphenol A-type epoxy resin as the epoxy resin, a hydrazide compound as a curing agent, and inorganic filler.

The bisphenol A-type epoxy resin is obtained by reacting bisphenol A and epichlorohydrin with each other by a one-step method or a two-step method. The bisphenol A-type epoxy resin has thermally curing property of tempering and bake-curing the metal automotive part at the same time and is excellent in the adhesiveness and corrosion resistance of the coating film. It is possible to use alicyclic epoxy resin, Novolac type epoxy resin, and acrylic epoxy resin together with the bisphenol A-type epoxy resin.

Examples of the bisphenol A-type epoxy resin commercially available include EpototoYD-011 which is the trade name (epoxy equivalent: 450 to 500 g/eq, softening point: 60 to 70 degrees C., produced by Nippon Steel Chemicals Co., Ltd.), EpototoYD-012 (epoxy equivalent: 600 to 700 g/eq, softening point: 75 to 85 degrees C., produced by Nippon Steel Chemicals Co., Ltd.), EpototoYD-013 (epoxy equivalent: 800 to 900 g/eq, softening point: 85 to 98 degrees C., produced by Nippon Steel Chemicals Co., Ltd.), EpototoYD-014 (epoxy equivalent: 900 to 1000 g/eq, softening point: 91 to 102 degrees C., produced by Nippon Steel Chemicals Co., Ltd.), EpototoYD-017 (epoxy equivalent: 1750 to 2100 g/eq, softening point: 117 to 127 degrees C., produced by Nippon Steel Chemicals Co., Ltd.), EpototoYD-019 (epoxy equivalent: 2400 to 3300 g/eq, softening point: 130 to 145 degrees C., produced by Nippon Steel Chemicals Co., Ltd.), EpototoYD-902 (epoxy equivalent: 600 to 700 g/eq, softening point: 82 to 92 degrees C., produced by Nippon Steel Chemicals Co., Ltd.), and EpototoYD-904 (epoxy equivalent: 900 to 1000 g/eq, softening point: 96 to 107 degrees C., produced by Nippon Steel Chemicals Co., Ltd.).

Examples of the bisphenol A-type epoxy resin commercially available further include jER epoxy resin 1001 which is the trade name (epoxy equivalent: 450 to 500 g/eq, softening point: 64 degrees C., produced by Mitsubishi Chemical Corporation), jER epoxy resin 1002 (epoxy equivalent: 600 to 700 g/eq, softening point: 78 degrees C., produced by Mitsubishi Chemical Corporation), jER epoxy resin 1003 (epoxy equivalent: 670 to 770 g/eq, softening point: 89 degrees C., produced by Mitsubishi Chemical Corporation), jER epoxy resin 1004F (epoxy equivalent: 875 to 975 g/eq, softening point: 97 degrees C., produced by Mitsubishi Chemical Corporation), and jER epoxy resin 1005F (epoxy equivalent: 950 to 1050 g/eq, softening point: 107 degrees C., produced by Mitsubishi Chemical Corporation).

Examples of the bisphenol A-type epoxy resin commercially available further include AralditeXAC5007 which is the trade name (epoxy equivalent: 600 to 700 g/eq, softening point: 90 degrees C., produced by Nippon Chibagaigi K.K.), AralditeGT7004 (epoxy equivalent: 730 to 830 g/eq, softening point: 100 degrees C., produced by Nippon Chibagaigi K.K.), AralditeGT7097 (epoxy equivalent: 1650 to 2000 g/eq, softening point: 120 degrees C., produced by Nippon Chibagaigi K.K.), DER-664 (epoxy equivalent: 950 g/eq, produced by Dow Chemical Company), and 667 (produced by Dow Chemical Company). These bisphenol A-type epoxy resins may be used singly or in combination of not less than two kinds thereof.

As the curing agent of the bisphenol A-type epoxy resin, hydrazide compounds can be preferably used. Of the hydrazide compounds, organic acid polyhydrazide is preferable. It is possible to use the organic acid polyhydrazide containing not less than two hydrazide groups ($-CO-NH-NH_2$) in one molecule. Examples of the organic acid polyhydrazide include $C_2 \sim C_{40}$ aliphatic carboxylic acid dihydrazide such as oxalic acid dihydrazide, malonic acid dihydrazide, succinic acid dihydrazide, glutaric acid dihydrazide, adipic acid dihydrazide, sebacic acid dihydrazide, and eicosanedioic acid dihydrazide; aromatic polyhydrazides such as phthalic acid dihydrazide, terephthalic acid dihydrazide, isophthalic acid dihydrazide, pyromellitic acid dihydrazide, pyromellitic acid trihydrazide, and pyromellitic acid tetrahydrazide; monoolefinic unsaturated dihydrazide such as maleic acid dihydrazide, fumaric acid dihydrazide, and itaconic acid dihydrazide; and polyacrylic acid polyhydrazide.

Of these organic acid polyhydrazides, the aliphatic carboxylic acid dihydrazides are preferable. The adipic acid dihydrazide is especially preferable because it is excellent in the adhesiveness to the coating film in a condition in which the metal automotive part is tempered and based at the same time.

Regarding the mixing ratio of the hydrazide compounds, 1 to 50 parts by mass thereof is mixed with 100 parts by mass of the epoxy resin.

It is possible to use a curing accelerator in combination with the curing agent for the epoxy powder paint. As the curing accelerator, imidazole compounds can be exemplified. The imidazole compound is not limited to a specific one, but compounds having an imidazole group can be used. For example, Curezol which is the trade name (produced by Shikoku Chemicals Corporation) can be exemplified.

It is preferable that the epoxy resin powder paint contains an inorganic filler. Examples of the inorganic filler include barium sulfate, talc, silica, calcium carbonate, feldspar, wollastonite, alumina, titanium dioxide, iron oxide, and carbon black.

Of these inorganic fillers, the barium sulfate and the carbon black are the essential components.

Regarding the mixing ratio of the inorganic filler, 10 to 150 parts by mass thereof is mixed with 100 parts by mass of the epoxy resin.

The epoxy resin powder paint can be produced by using a production method known in a powder paint field. For example, after materials such as the bisphenol A-type epoxy resin, hydrazide compound, curing accelerator, barium sulfate, and carbon black are mixed with one another by using a Henschel mixer or the like, the mixture is melted and kneaded by using a device such as an extruder or a heat roller well known by those skilled in the art. After the kneaded mixture is cooled, it is pulverized and classified. As the condition of melting and kneading the mixture, it is preferable to melt and knead it at a temperature at which a curing reaction does not proceed or a temperature not more than that.

As a method for sticking powder to the surface of the metal automotive part by using the powder coating method, it is possible to use methods such as a spray coating method, an electrostatic powder coating method, an electric field flow electrostatic coating method, and a flow immersion method well known by those skilled in the art. The electrostatic powder coating method is preferable in consideration of the configuration of the surface of the metal automotive part. In the electrostatic powder coating method, it is possible to utilize both a gun type method of spraying charged powder paint by means of a sprayer and an electrostatic atomization method of atomizing charged paint by utilizing the repulsion of the charged paint.

As the electrostatic powder coating method to be used for the outer joint member constructing the constant velocity universal joint, it is especially preferable to adopt a method of charging the paint by means of a paint gun and applying epoxy powder to the surface of the grounded outer joint member by using static electricity.

Figure 2:
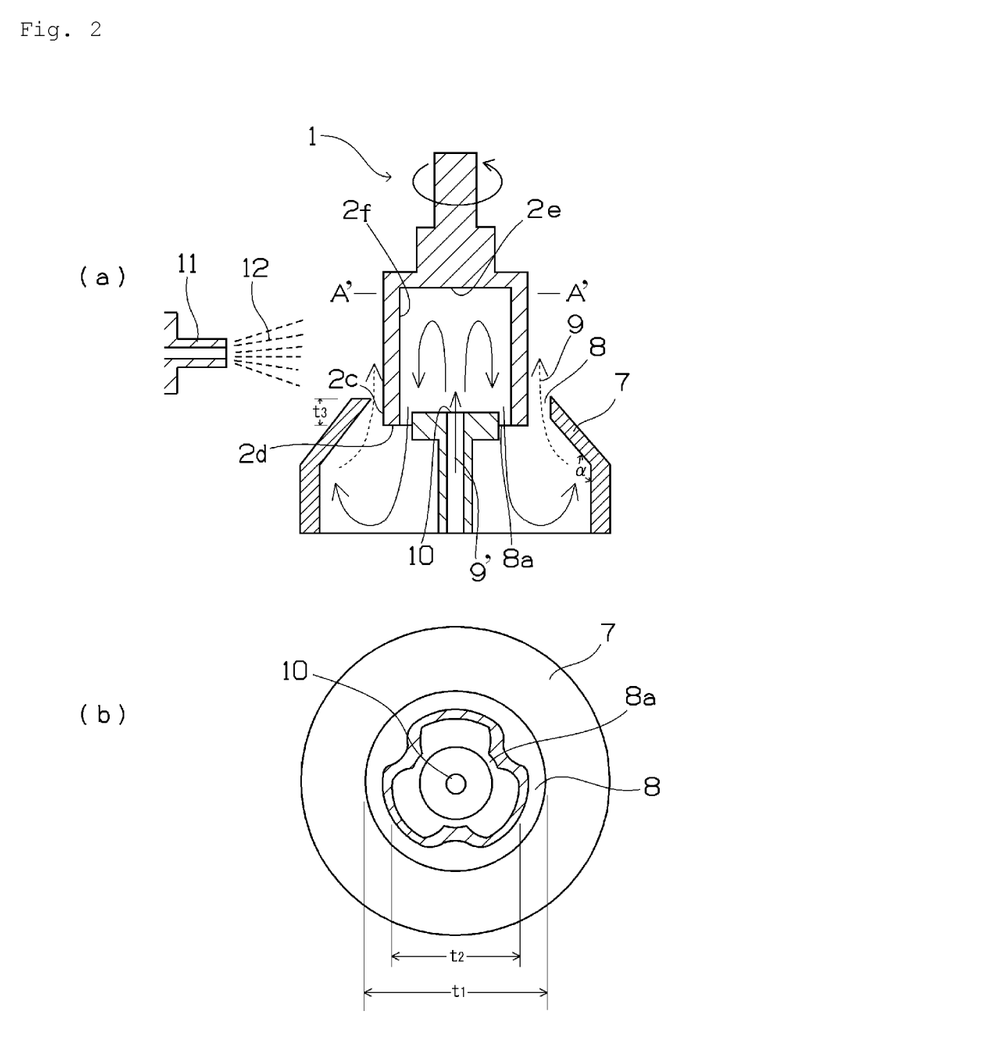
FIG. 2 shows a state in which powder is applied to an outer circumferential portion of an outer joint member.

With reference to FIG. 2, the production process of the electrostatic powder coating method is described below. FIG. 2(a) is a sectional view showing a state in which powder is applied to the outer circumferential portion of the outer joint member. FIG. 2(b) is a plan view taken along the line A'-A' as viewed in the axial direction of the outer joint member.

(1) Process of Providing Covering Jig

To form the coating film on a necessary portion of the outer circumferential surface of the outer joint member 1 without forming the coating film on the outer circumferential surface 2c at the axial end thereof, a convergent nozzle-shaped covering jig 7 is provided.

The convergent nozzle becomes smaller toward its tip in its diameter in a gas flow direction. A tip diameter $t_1$ of the nozzle is set larger than a diameter $t_2$ of the outer circumference of the outer joint member 1 to be coated with paint. In a plan view, a gap 8 is formed between the tip portion of the nozzle and the outer circumferential surface of the outer joint member 1 at the axial end thereof in such a way that the tip circle of the nozzle and the outer circumference circle of the outer joint member are concentric with each other. The distance of the gap 8 is $[(t_1-t_2)/2]$.

The covering jig 7 is disposed in such a way that the tip portion of the nozzle thereof sectionally skirt-shaped covers the outer circumferential surface 2c of the outer joint member 1 at the axial end thereof.

An angle α forming the tip portion of the nozzle of the covering jig 7 as the sectionally skirt-shaped configuration is set to 90 degrees<α<180 degrees and preferably 120 degrees<α<150 degrees. By setting the angle α to this range, it is possible to uniformly discharge a gas from a gap 8 and easily accommodate powder which has not stuck to the outer circumferential surface of the outer joint member at the axial end thereof in a collection booth for collecting powder.

The distance of the gap 8 can be altered according to the configuration of the outer circumferential surface of the outer joint member 1, the sectionally skirt-shaped configuration of the covering jig, and the discharge amount of the gas.

The coating film is not formed on the outer circumferential surface 2c of the outer joint member 1 at its axial end covered with the covering jig 7. The outer circumferential surface 2c has a length $t_3$ which can be adjusted according to a vertical movement of the outer joint member 1 and/or that of the covering jig 7.

(2) Gas Discharge Process

In the gas discharge process, a gas is discharged from the gap 8 formed between the outer joint member 1 and the covering jig 7 with the outer joint member 1 being rotated about its axis. The gas to be discharged from the gap 8 is preferably compressed air.

As a gas 9 to be discharged from the gap 8, it is preferable to inject a gas 9' into the cup part via a gas injection port 10 in such a way that the injected gas 9' collides with a cylindrical inner surface of the cup part 2 and especially with a central portion 2e of the cylindrical inner surface of the cup part. The gas injection port 10 is so disposed that the injected gas 9' collides with the central portion 2e of the cylindrical inner surface of the cup part. It is preferable to dispose a discharge surface of the gas injection port 10 at a side inward from the cylindrical end surface 2d of the cup part 2. By disposing the discharge surface of the gas injection port in this way, it is possible to securely allow the injected gas to collide with the central portion 2e of the cylindrical inner surface of the cup part. The gas injected into the cup collides with the central portion 2e of the and flows along a wall surface 2f inside the cylinder, thus being discharged from the gap 8a with the gas circulating and stagnating inside a space provided inside the covering jig 7. By circulating and stagnating the gas in the space provided inside the covering jig 7, it is possible to control the flow velocity and flow rate of the gas to be discharged from the gap 8. The flow of the gas is shown in FIG. 2 with arrows.

It is preferable to form the gap 8a by forming a peripheral portion of the gas injection port 10 into a flange shape and making the tip diameter of the outer circumference of a flanged portion of the gas injection port smaller than the diameter of the inner circumferential surface of the cup part 2. By passing the gas which has collided with the central portion of the cylindrical inner surface through the gap 8a, the gas which has been discharged from the gap 8a becomes a jet stream and has a high flow velocity. Therefore even in a case where a length $t_3$ of the portion 2c covered with the covering jig 7 is short, it is possible to prevent the paint from penetrating into the end surface 2d of the cup part 2 and from sticking thereto.

In the case of a splined shaft of a hollow article, by blocking the portion thereof to be uncoated by means of a rubber stopper or the like, it is possible to flow the gas in the above-described form.

(3) Process of Sticking Film-Forming Material to Outer Joint Member

In this process, a film-forming material is stuck to the outer joint member 1 which is a rotating metal automotive part from an axial side surface thereof.

In coating the outer circumferential surface of the cup part 2 of the outer joint member 1 by carrying out electrostatic powder coating, as shown in FIG. 2(a), after powder paint 12 is charged by means of a paint gun 11 from the axial side surface of the outer joint member, the epoxy powder is applied to the surface of the outer joint member 1 by using static electricity.

The powder paint applied to the outer circumferential surface of the metal automotive part and stuck thereto is thermally cured to form the coating film.

As a method of thermally curing the powder paint, it is preferable to temper and thermally cure the coating film at the same time in a condition for tempering the metal automotive part. The metal automotive part is tempered by means of high-frequency induction heating. As an apparatus and method for performing the high-frequency induction heating, it is possible to adopt the apparatus and method described in the patent document 4.

The high-frequency induction heating apparatus is constructed of a transport path such as a conveyor for transporting the outer joint member having the powder paint stuck to its outer circumferential surface after the outer joint member is subjected to the high frequency quenching and a high-frequency induction coil, disposed along a part transport direction of the transport path, which tempers and bake and cure the outer joint member at the same time.

Figure 3:
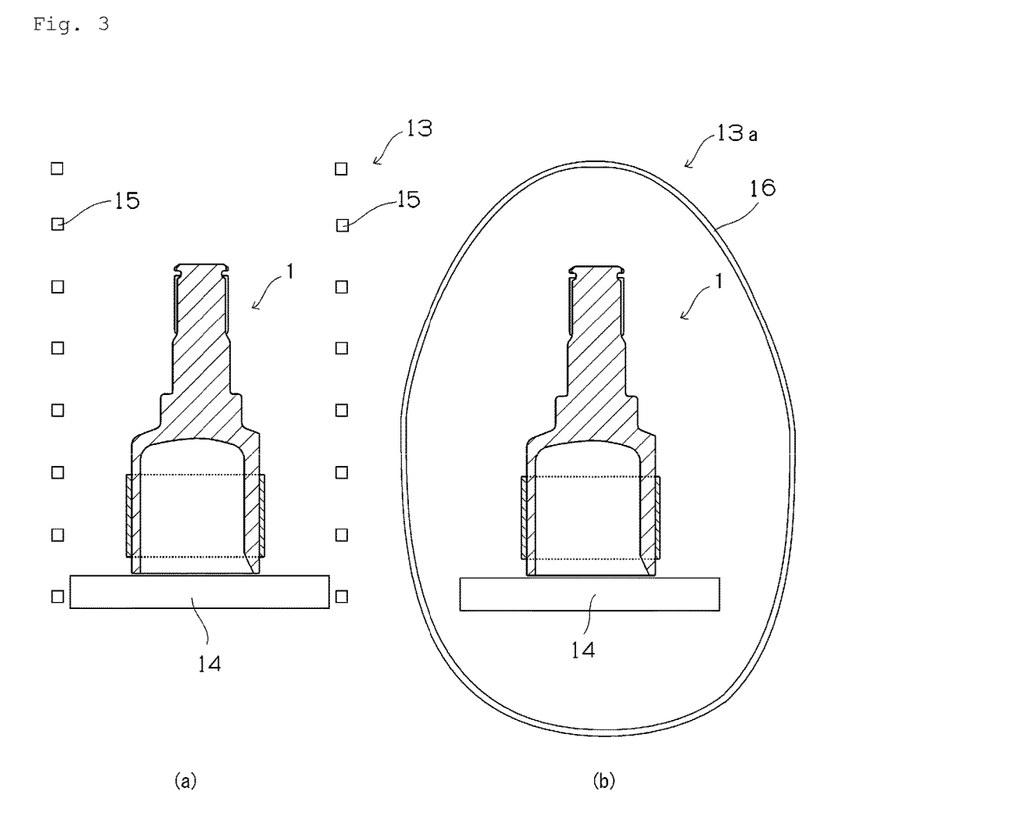
FIG. 3 shows the outline of a high-frequency induction heating apparatus.

FIG. 3 shows the outline of the high-frequency induction heating apparatus. FIGS. 3(a) and 3(b) are sectional views, vertical to the direction in which the outer joint member 1 is transported, each of which shows a coil pass type high-frequency induction heating apparatus.

A high-frequency induction heating apparatus 13 continuously heats the outer joint member 1 moving on a transport path 14 by means of a high-frequency induction coil 15.

A high-frequency induction heating apparatus 13a intermittently heats the outer joint member 1 moving on the transport path 14 by means of a high-frequency induction coil 16. At a front stage of each of the high-frequency induction heating apparatuses, there is installed a powder coating apparatus (not shown) for sticking powder paint to the outer surface of the outer joint member 1 after the outer joint member is subjected to the high frequency quenching by carrying out the powder coating method. At a rear stage of each of the high-frequency induction heating apparatuses, there is installed a water-cooling apparatus and an air blow apparatus (not shown) for cooling the outer joint member 1.

A part of the high-frequency induction heating apparatus shown in FIG. 3(a) has the high-frequency induction coil 15 disposed at both sides of the transport path 14 linearly extended along a part transport direction. A linear portion of the high-frequency induction coil 15 of the high-frequency induction heating apparatus heats the outer joint member 1 moving on the transport path 14 from both sides of the outer joint member. Although not shown, one linear portion of the high-frequency induction coil 15 positioned at one side of the transport path 14 and the other linear portion of the high-frequency induction coil 15 positioned at the other side of the transport path 14 are electrically connected to each other so that the linear portions of the high-frequency induction coil 15 do not interfere with carry-in and carry-out of the outer joint member 1 at the entrance and exit sides of the transport path 14 to form the high-frequency induction coil.

The high-frequency induction heating apparatus shown in FIG. 3(b) has the high-frequency induction coil 16 wound spirally along the part transport direction of the transport path 14 in such a way as to enclose the outer joint member 1 moving on the transport path 14. The high-frequency induction coil 16 of the high-frequency induction heating apparatus is so disposed that the entire high-frequency induction coil extends along the part transport direction of the transport path 14. The high-frequency induction coil 16 heats the entire circumference of the outer joint member 1 moving on the transport path 14.

The coil-pass type high-frequency induction heating apparatus shown in FIG. 3(a) and the coil-pass type high-frequency induction heating apparatus shown in FIG. 3(b) can be combined with each other.

It is possible to use a high-frequency power supply which supplies a heating coil with a high-frequency electric current for the high-frequency induction heating apparatus. As the high-frequency power supply, it is possible to exemplify an electrically powered generator type oscillator, an electron tube morale oscillator, a thyristor inverter type oscillator, and a transistor inverter type oscillator. It is possible to provide the heating coil with an electric current transformer (output trans) for supplying a low voltage and a high current.

The high-frequency electric current is not specifically limited in its frequency, but normally an electric current having a frequency not less than 1 kHz. With an increase in the frequency of an electric current, owing to skin effect, only the neighborhood of the surface of a part is heated, whereas with a decrease in the frequency thereof, the part is heated to its inside.

The outer joint member having the powder paint stuck to its outer surface by carrying out the powder coating method by using the high-frequency induction heating apparatus is heated for three to five minutes from a room temperature to a highest temperature of 200 to 240 degrees C. In this heating condition, the outer joint member 1 is tempered, and the powder paint is thermally cured at the same time. Thereafter the outer joint member 1 is transported to a cooling position. While the outer joint member 1 is being transported, it is naturally cooled. Thereafter the outer joint member 1 is water-cooled and cooled by an air blow apparatus for one to three minutes.

Figure 4:
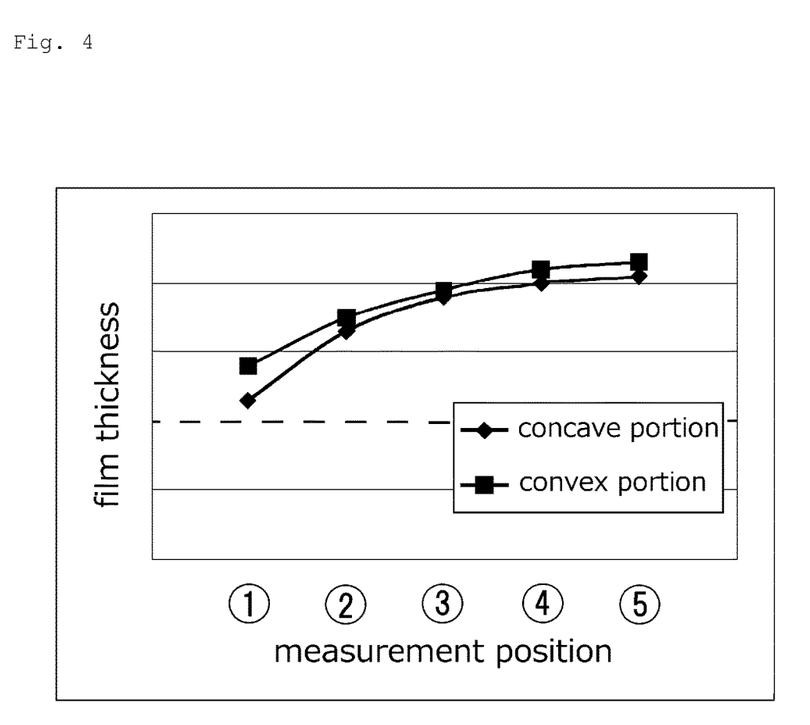
FIG. 4 shows the results of measurement of the thickness of a coating film of the present invention.
Figure 6:
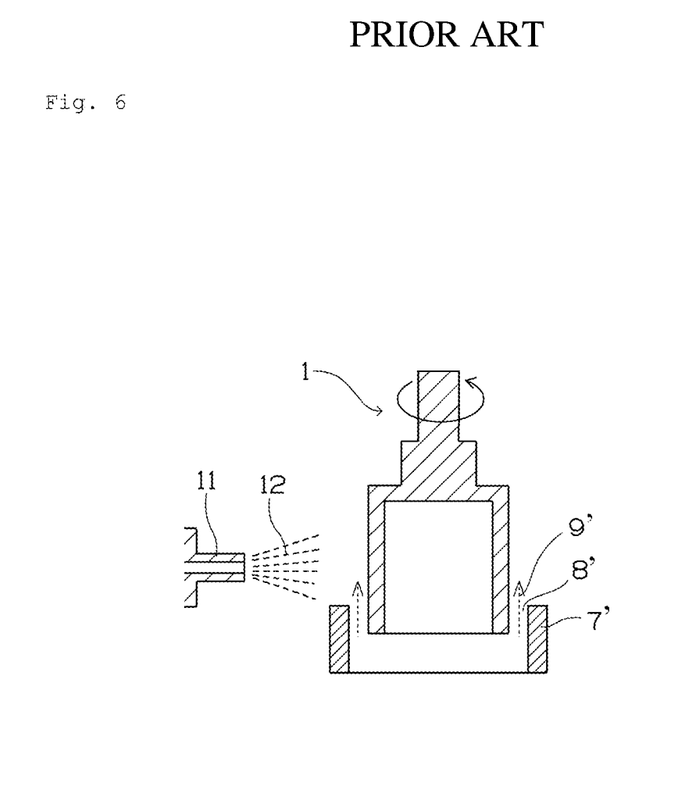
FIG. 6 shows a state in which powder paint is applied to a metal automotive part by a conventional coating method.
Figure 7:
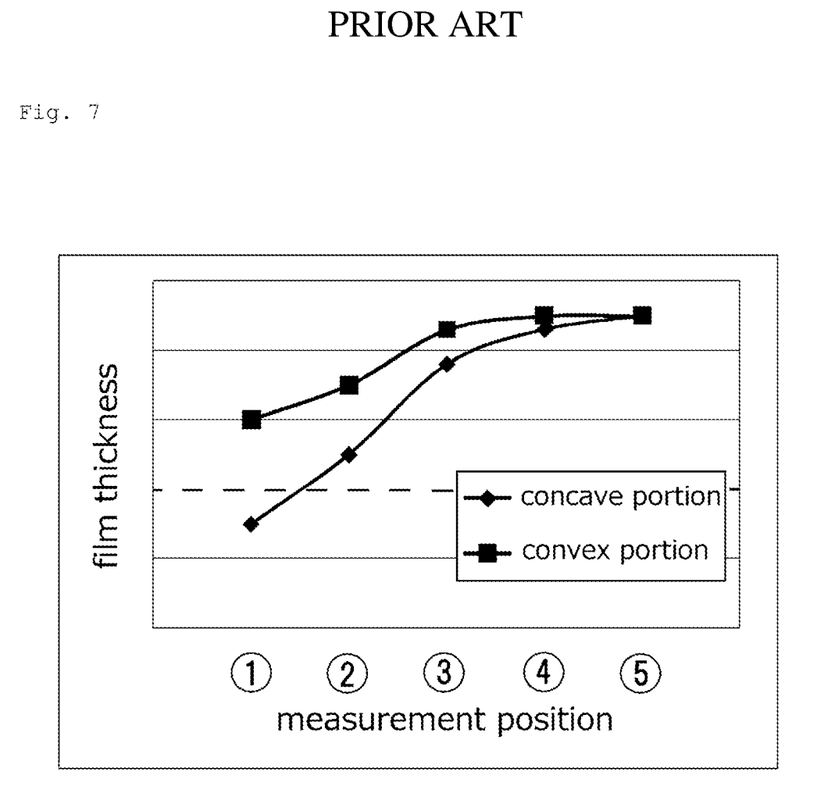
FIG. 7 shows results of measurement of the thickness of a coating film formed by a conventional method carried out by using a covering jig.

FIG. 4 shows results of measurement of the thickness of a coating film formed by carrying out the above-described method. As a comparative example, the outer joint member was produced by using masking carried out by a conventional method. FIG. 6 shows a coating method carried out by using a conventional covering jig. FIG. 7 shows results of measurement of the thickness of a coating film formed by carrying out a conventional method.

In the conventional coating method shown in FIG. 6, while compressed air 9' is flowing directly to a gap 8' formed between the outer joint member 1 and a covering jig 7' whose discharge port is disposed parallel with the outer joint member 1, the outer joint member is coated with powder paint 12 by means of a paint gun 11 from the side surface of the outer joint member in its axial direction. The compressed air 9' is injected into the gap 8' from a compressed air injection port (not shown) provided to discharge the compressed air toward the outer circumference of the outer joint member 1.

In FIGS. 4 and 7, the abscissa indicates positions where the thickness of the coating films 6 shown in FIG. 1 is measured. The ordinate indicates the thickness of the coating film. A thickness not less than the thickness at the broken line is a proper range of the film thickness. The concave portion shows the thickness of the portion 2a in FIG. 1 (b). The convex portion shows the thickness of the portion 2b in FIG. 1 (b).

In the method of the present invention shown in FIG. 4, although a gradual decrease in the thickness of the coating film is admitted toward numeral 1 enclosed within a circle showing the measurement position, the amount of change in the thickness thereof is small. A proper thickness could be obtained. In addition, there was a small difference between the thickness of the film formed on the concave portion and that of the film formed on the convex portion.

In the method of the conventional method shown in FIG. 7, the thickness of the coating film became smaller toward numeral 1 enclosed within a circle showing the measurement position with an increase in the flow velocity of the gas. In addition, there was a big difference between the thickness of the film formed on the concave portion and that of the film formed on the convex portion.

Figure 5:
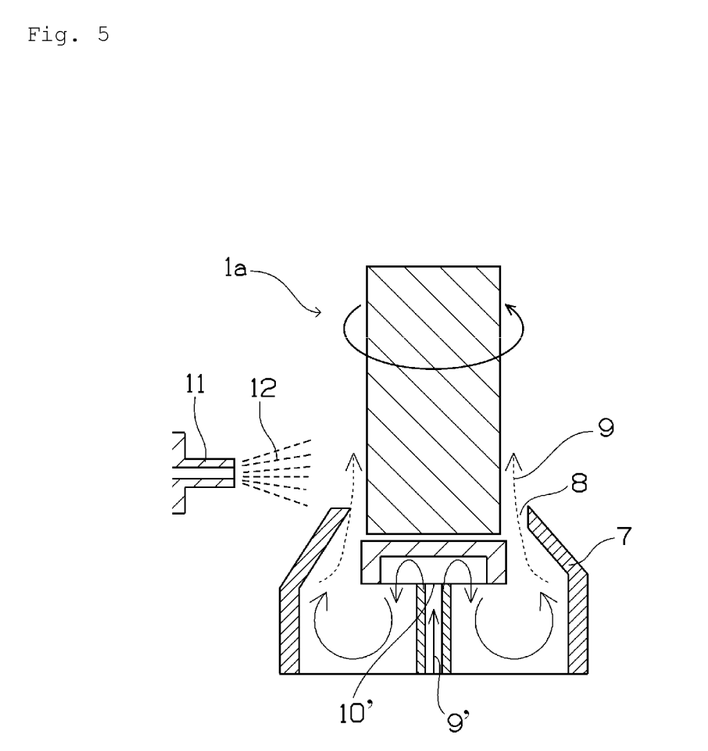
FIG. 5 is a sectional view showing a state in which powder coating paint is applied to a columnar metal automotive part.

A case in which a cylindrical metal automotive part is coated with paint is described below with reference to FIG. 5. FIG. 5 is a sectional view showing a state in which powder 12 is applied to an outer circumferential surface of an intermediate shaft 1a at an axial end thereof.

As in the case of coating the columnar metal automotive part with powder, the convergent nozzle-shaped nozzle 7 is provided.

A gas 9 is discharged from a gap 8 formed between the intermediate shaft 1a and the covering jig 7 with the intermediate shaft 1a being rotated about its axis. A gas 9' is injected into the covering jig 7 from a gas injection port 10' formed on the axial end surface of the intermediate shaft 1a. The gas 9' injected into the covering jig 7 is discharged as the discharged gas 9 from the gap 8 with the gas 9' circulating and stagnating inside a space of the covering jig 7.

After the powder paint 12 charged by means of a paint gun 11 is applied to the outer circumference of the intermediate shaft 1a from an axial side surface thereof, the coating film is bake-cured as in the case of the outer joint member 1. Thereby a masking effect similar to that of the outer joint member 1 is obtained.

As examples of the metal automotive part having the coating film formed on the surface thereof by carrying out the powder coating method, the outer joint member constructing the above-described constant velocity universal joint or the intermediate shaft constructing the drive shaft is exemplified.

The thickness of the coating film to be formed on the surface of the outer joint member or that of the intermediate shaft is preferably 40 to 150 μm. In the case where the thickness of the coating film is less than 40 μm, the coating film is inferior in its corrosion resistance. In the case where the thickness thereof exceeds 150 μm, the powder paint does not sufficiently stick to the surface of the outer joint member or that of the intermediate shaft to be coated with the powder paint. Thus it takes long to bake-cure the powder paint and in addition, the coating film is liable to generate unnecessary spillage after the powder paint is bake-cured.

It is preferable that the above-described coating film has H to 2 H in its pencil hardness and has not less than 120 hours in the corrosion resistance thereof in a salt spray test. In the case where the pencil hardness of the coating film is less than H, there is a possibility that it may peel off the outer surface of the outer joint member or that of the intermediate shaft owing to contact between the coating film and outside objects (blown stone or the like). In the case where the pencil hardness exceeds 2 H, the coating film has a low flexibility.

Because it is possible to thicken the above-described coating film, the corrosion resistance thereof is not less than 120 hours in the salt spray test. Thus the coating film is improved over conventional coating films formed by using water-soluble baking coating agent or the like.

The constant velocity universal joint has the outer joint member having the coating film formed on the surface thereof by the above-described powder coating, an inner joint member, a drive shaft coupled to the inner joint member, and a boot mounted on the outer joint member and the drive shaft directly or through a separate member. The above-described coating film is formed on the surface of the intermediate shaft of the drive shaft.

Examples of the construction of the constant velocity universal joint are as described below. The outer joint member and the drive shaft are applicable to any construction described below.

By forming the coating film, it is possible to prevent the thickness of the coating film from decreasing at a boundary between a portion to be masked and a portion not to be masked, shorten the processing period of time required to form the coating film, and allow the property of the obtained coating film to be excellent. Thus the coating method of the present invention is capable of producing the constant velocity universal joint excellent in its durability with a high productivity.

(A) A construction having the outer joint member having axially extended three linear track grooves formed on the inner circumferential surface thereof, a tripod member serving as the inner joint member having three trunnions radially projected, and a roller serving as a rolling element supported to be rotatable about the trunnions, wherein the roller is disposed rollably along the track groove of the outer joint member.

(B) A construction having the outer joint member having a plurality of axially extended linear track grooves formed on a cylindrical inner circumferential surface thereof, the inner joint member having a plurality of linear track grooves, forming a pair with the track grooves of the outer joint member, which are formed on a spherical outer circumferential surface thereof, balls (three to eight) serving as rolling elements disposed between the track grooves of the outer joint member and those of the inner joint member, and a cage, disposed between the outer joint member and the inner joint member, which holds the above-described balls.

(C) A construction having the outer joint member having a plurality of linear track grooves formed on an inner circumferential surface thereof, the inner joint member having a plurality of linear track grooves, forming a pair with the track grooves of the outer joint member, which are formed on an outer circumferential surface thereof with these track grooves and those of the outer joint member tilting at a predetermined angle in opposite directions with respect to the axis of the inner joint member, balls (4, 6, 8 or 10 pieces) interposed at an intersection between the track grooves of the outer joint member and those of the inner joint member, and a cage, disposed between the outer joint member and the inner joint member, which holds the balls.

The constant velocity universal joint having the coating film can be produced in desired forms. It is possible to use the constant velocity universal joint as a fixed type such as a zeppa type and a bar field type using a ball in addition to a slide type constant velocity universal joint such as the above-described tripod type, a double offset type, and a cross group type all of which has a mechanism sliding in an axial direction of the outer joint member. It is possible to use both a double roller type constant velocity universal joint and a single roller type as the tripod type constant velocity universal joint.

As the method for producing the metal automotive part, although the powder coating method has been described, the method of the present invention is applicable to a ceramic spraying method of spraying paint to the outer circumferential surface thereof including the portion to be covered with powder paint and the portion not to be covered therewith and a coating film forming method using a method other than the powder coating method.

INDUSTRIAL APPLICABILITY

The coating film of the present invention does not generate defects such as unnecessary deposition, spillage, and fat edge at the boundary between the portion to be coated with powder paint and a portion to be uncoated therewith and is excellent in its corrosion resistance. Thus the coating film of the present invention is preferably applicable to the metal automotive part such as the constant velocity universal joint.

EXPLANATION OF REFERENCE NUMERALS AND SYMBOLS

1: outer joint member
2: cup part
3: shaft part
4: inner circumferential surface
5: track groove
6: coating film
7: covering jig
8: gap
9: gas
10: gas injection port
11: paint gun
12: powder paint
13: high-frequency induction heating apparatus
14: transport path
15, 16: high-frequency induction coil

The invention claimed is:

1. A method for producing a columnar or cylindrical metal automotive part whose outer circumferential surface includes a portion to be coated with paint and a portion to be uncoated therewith, said method comprising the steps of:
    providing a convergent nozzle-shaped covering jig that has a converged end
    covering said portion to be uncoated with said paint with the covering jig, wherein said covering is such that the outer circumferential surface of said columnar or cylindrical metal automotive part is covered at an axial end thereof by the covering jig and is such that a gap is formed between the covering jig and said outer circumferential surface of said columnar or cylindrical metal automotive part;
    discharging a gas from said gap, which is located at the converged end of the covering jig, while said columnar or cylindrical metal automotive part is rotated; and
    applying a film-forming substance to said columnar or cylindrical metal automotive part from an axial side surface thereof, wherein the resulting applied film-forming substance sticks to said columnar or cylindrical metal automotive part.

2. A method for producing a columnar or cylindrical metal automotive part according to claim 1, wherein the step of discharging said gas from said cap is such that the gas is flowed toward an axial end surface of said columnar metal automotive part or toward an inner surface of said cylindrical metal automotive part and is thereafter discharged from said gap through a space inside said covering jig.

3. A method for producing a columnar or cylindrical metal automotive part according to claim 1, wherein said gas is compressed air.

4. A method for producing a columnar or cylindrical metal automotive part according to claim 1, wherein said film-forming substance is powder coating paint.

* * * * *